United States Patent [19]

Brockwell et al.

[11] 4,396,278
[45] Aug. 2, 1983

[54] PHOTOGRAPHIC ENLARGER

[75] Inventors: Malcolm G. Brockwell, Ilford; David B. Harrington, Burnham-on-Crouch, both of England

[73] Assignee: Ciba-Geigy AG, Basel, Switzerland

[21] Appl. No.: 309,160

[22] Filed: Oct. 7, 1981

[30] Foreign Application Priority Data

Oct. 14, 1980 [GB] United Kingdom ............... 8033141

[51] Int. Cl.³ ...................... G03B 27/54; G03B 27/72
[52] U.S. Cl. ........................................ 355/37; 355/70
[58] Field of Search ............................. 355/37, 70, 52

[56] References Cited

U.S. PATENT DOCUMENTS

| 2,480,101 | 8/1949 | Weisglass | 355/70 |
| 2,985,062 | 5/1961 | Clapp | 355/37 |
| 3,044,351 | 7/1962 | Patterson | 355/70 |
| 3,290,989 | 12/1966 | Beattie et al. | 355/70 |
| 3,716,298 | 2/1973 | Reardon | 355/71 |

FOREIGN PATENT DOCUMENTS 2528673 1/1977 Fed. Rep. of Germany .
71115 10/1959 France .

Primary Examiner—Monroe H. Hayes
Attorney, Agent, or Firm—Harry Falber

[57] ABSTRACT

In the light path of a photographic enlarger, a supplementary light source is arranged in such a way that an image thereof is formed by the condenser in the focal plane of the imaging lens but outside the range covered by the latter. If the original to be printed has scratches, these deflect at least a part of the light, which reaches them from the supplementary light source into the lens. As a result, that proportion of the actual printing light supplied by the printing light source which is deflected past the lens by the scratches is at least partially compensated. The image of the scratches on the printing material is virtually invisible.

10 Claims, 3 Drawing Figures

PHOTOGRAPHIC ENLARGER

THE INVENTION relates to a photographic enlarger.

When photographic enlargers with condenser optics are used, scratches on the photographic negative are usually reproduced very clearly visible on the finished print, in particular because a scratch has the effect that at least one surface of the negative is no longer planar. Consequently, the front and back of the negative are no longer parallel in the zone of the scratch. Since the refractive indices of the film base and of the gelatin are greater than that of air, a light ray passing through this zone of the negative is deflected from its path of incidence. Thus, a ray originating from a relatively small light source is deflected to such an extent that it falls outside the objective lens. If no precautions to avoid this effect are taken, a scratch on the negative causes the appearance of an unexposed line on the print. If the printing material gives positive prints when treating a negative, the unexposed line appears white and therefore has a particularly conspicuous and interfering effect.

It is already known to hide scratches on negative by the use of large diffuse light sources. If, however, colour filters are to be used in order to achieve certain required properties of the print with respect to contrast or colour, the output capacity of the system is impaired. When a large diffuse light source is used, it is then necessary to employ lamps of higher power, and this has proved to be expensive and inconvenient.

It is known that enlargers with condenser optics can give a relatively high efficiency of light utilisation. It is also known that such an enlarger tends to produce images of all the scratches and dust shadows on the negative.

Moreover, it is known that such scratches are rendered visible to a smaller extent when the size of the light source is increased to such an extent that its image reaches beyond the objective lens (over-fill), and/or when light diffusion means are placed in the optical path in front of the plane of the negative. Either of these two measures, however, reduces the efficiency of light utilisation, and this reduction is already serious before the scratches in the negative have been adequately covered.

A way has now been found for improving a photographic enlarger of the type just described, in such a way that the reproduction, on the prints produced, of scratches present on the negative to be printed by the apparatus is greatly reduced, without the use of a large light source of diffuse light being required for this purpose.

According to the present invention there is provided a photographic enlarger with a printing light source which, via a condenser, illuminates a plane for receiving the original to be printed, an image of which is formed in a printing plane by means of a lens, the image of the printing light source in the focal plane of the lens being at least not substantially larger than the range covered by the lens, together with a supplementary light source which is arranged in such a way that, when no original to be printed is in position, an image of the supplementary light source is formed by the condenser in the focal plane of the lens but outside the range covered by the latter.

The use of the invention in photographic enlargers with light-blending elements is of particular importance.

Therefore in this embodiment of the invention there is provided a photographic enlarger as just defined in which the printing light source is formed by the output of a light-blending element which is fed by at least two primary light sources, preferaby via colour filters or the like, wherein the supplementary light source is arranged to the side of the output of the light-blending element.

Photographic enlargers of this type are used when light from primary light sources is passed through colour-selective filters, associated with each of these light sources, into a light-blending element. Such enlargers are used in the preparation of colour prints from colour negatives and in the preparation of black-and-white prints having variable contrast, for example on variable contrast paper, starting from black-and-white negatives.

If, when operating an enlarger according to the invention, a scratch on the photographic negative to be printed is present in the light path, light from the supplementary light source is deflected and passes through the objective lens, whereby the area which corresponds to the scratch on the print is illuminated particularly strongly. This technique enables both the image-producing light and the light which covers the scratch to be controlled independently, so that optimum optical performance can be achieved.

It has also been found that, as a result of appropriately adjusting the light output of the supplementary light source in order to cover scratches in the lighter tones of the print, scratches in the darker tones also are no longer noticeable. In the production of prints on variable contrast paper by the enlarger, this makes it possible to use supplementary light sources the colour temperature of which differs from that of the primary light source.

A further advantage of the photographic enlarger according to the invention results from the significant reductions in energy consumption and heat loss, which can be achieved with this enlarger during the focussing before printing, for which purpose only image light is necessary, as compared with a condenser enlarger having only one light source and comparable power.

If the lamp housing used in the enlarger according to the invention is of the type which is particularly suitable for the exposure and printing of photographic material having variable contrast, the colour quality of the light from the primary light source can be adjusted in such a way that it contains mutually exclusive energy fractions in the wave bands from 400 to 450 nm and from 460 to 530 nm. In this embodiment, two tungsten filament lamps, each with its associated filter, are preferably used.

In another embodiment of the lamp housing used in the enlarger according to the invention, the lamp housing comprises a primary light source which can be adjusted in such a way that, by interposition of colour-correction filters into the light path between the primary light source and the light-blending element, prints of correct colour balance are obtained on colour-printing material. In this embodiment, selective colour filters for the subtractive primary colours yellow, magenta and/or cyan can be inserted for a greater or lesser length into the light path between the primary light source and the blending element.

In an alternative embodiment which is likewise suitable for the production of colour prints, three tungsten filament lamps can be used in conjunction with, in each case, a red, a green and a blue colour filter. The fractions of red, green and blue light which are incident on the light-blending element can be varied by correspondingly altering the voltages applied to the individual lamps.

The light-blending element effects blending of the adjustable light incident from the primary light source, in such a way that the light emanating from the blender homogeneously illuminates the total area of the original being printed (negative). The light-blending element used can be an opal diffuser, a cylindrical rod of glass or acrylic resin, or a plate of glass of acrylic resin for example. The blender can also be formed by an element having a structured light-mixing surface, in particular a ribbed or faceted surface. Blending elements of this type can be operated in transmitted light or in reflected light. In the latter case, the light input and light output of the blending element coincide. Preferably, a type of blending element is used which does not excessively increase the divergence of the light. Relative to the condenser system, the output of the light-blending element is arranged in a plane, from which the light is directed by the above mentioned system onto the objective lens.

In a preferred embodiment of the enlarger according to the invention, the additional light source is arranged in the same plane as the output of the light-blending element. In this case, the position of this plane is such that the optical axis of the light from the light-blending element is perpendicular thereto.

Electric discharge tubes filled with rare gas may be used as the supplementary light source.

Preferably at least two fluorescent tubes which are arranged in pairs in mutually opposite positions in relation to the printing light source or the light-blending element. Preferably in this case the fluorescent tubes are arranged parallel to the edges of the original to be printed.

Alternatively the fluorescent tube is in the form of a ring or U surrounding the printing light source or the light-blending element.

Such tubes preferably have a light output of 50 lumens/Watt. On the other hand, the supplementary light source provided can also be one or more, in particular two, tungsten filament lamps having a light output of 20 lumens/Watt.

Alternatively a flash source can be used as the supplementary light source, particularly an electronic flash tube.

An additional advantage of the use of discharge tubes is the high emission in the blue-violet region of the light spectrum, as compared with other light sources, and this in turn results in a high actinic effect.

Preferably, the supplementary light source comprises light-screening means for preventing mixing of the light from the supplementary source with that from the primary light source. Thus, the divergence of the light from the light-blending element can be less than that of the light from the supplementary light source.

The drawings which follow illustrate an exemplary embodiment of the enlarger according to the invention.

Figure 1:
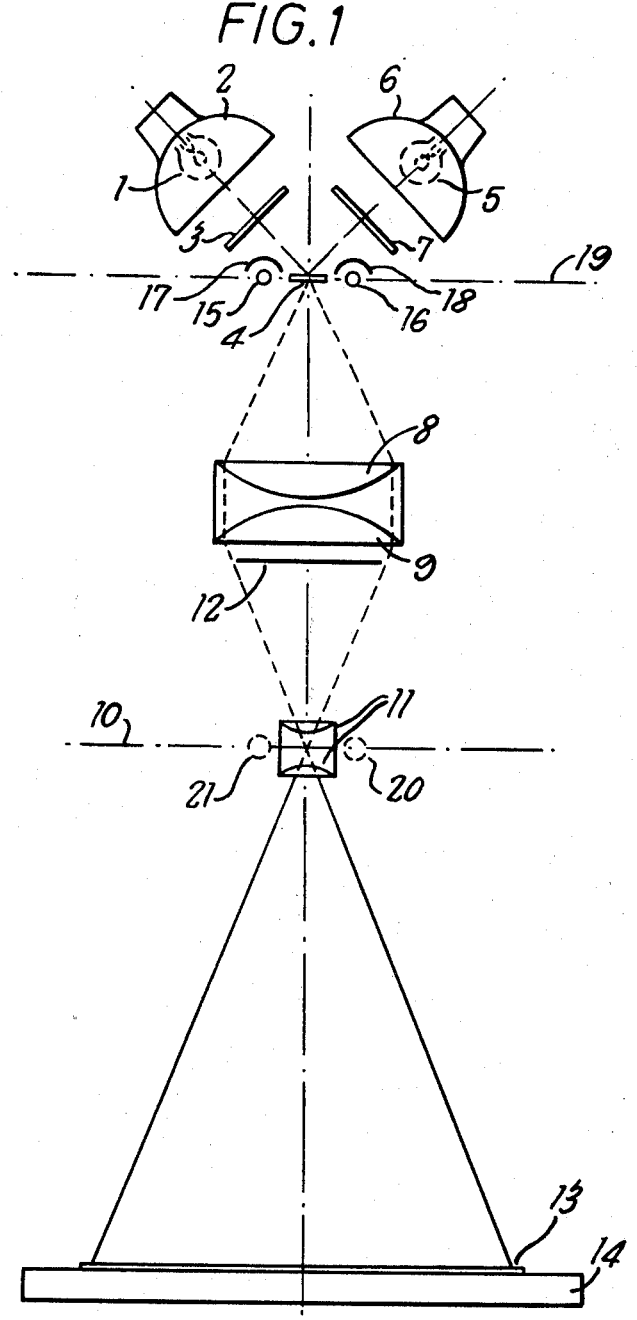
FIG. 1 shows a diagramatic front view of the enlarger.

According to FIG. 1, light from a first tungsten filament lamp 1 is deflected by an ellipsoidal mirror 2 through a colour-selective filter 3 and is incident on a light-blending element 4. Light from a second tungsten filament lamp 5 is reflected by the associated ellipsoidal mirror 6 so that, through the colour-selective filter 7, it is also incident on the light-blending element 4. The spectral transmission characteristics of the filters 3 and 7 differ from one another. The colour quality of the light incident on the light-blending element 4 can be varied by altering the voltage applied to one or the other of the two lamps 1 and 5.

An image of the output of the light-blending element 4 is formed in the plane 10 of an objective lens 11 by the condenser lenses 8 and 9. A negative 12 is placed close to the lower condenser lens 9, and the objective lens 11 projects an image of the negative 12 onto a light-sensitive printing material 13 placed on a frame 14.

If the negative 12 contains a black-and-white silver image, the filter 3 can be transparent for a wave-band from 400 to 450 nm and the filter 7 can be transparent for a waveband from 460 to 530 nm. Prints in alternating contrasts on photographic printing material of variable contrast of known type can then simply be obtained by corresponding adjustment of the voltages applied to the lamps 1 and 5.

If, on the other hand, the negative 12 is multicoloured, the filter 3 can be magenta (transparent for red and blue light) and the filter 7 can be cyan (transparent for green and blue light). Consequently, since a change in the supply voltage of the tungsten filament lamp changes the output of blue light from the latter to a greater extent than the output of green or red light, the proportions of red, green and blue light emitted by the light-blending element 4 can be varied by adjusting the voltages applied to the lamps 1 and 5. Prints having different colour balances on a suitable colour-printing material 13 can thus be obtained by correspondingly adjusting the voltages applied to the lamps 1 and 5.

Figure 2:
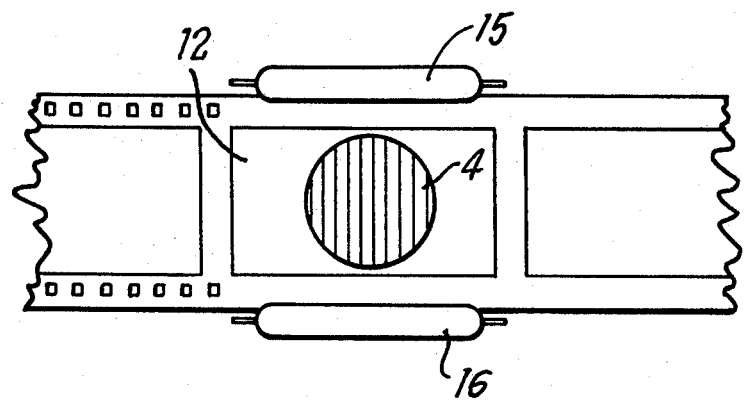
FIGS. 2 and 3 show two detail variants represented in plan view.

As shown in FIGS. 1 and 2, straight electronic flash tubes 15 and 16 are arranged on the right and on the left next to the light-blending element 4 in a plane 19 which is substantially common with the latter. The reflectors 17 and 18 are arranged in such a way that they reflect the light from the tubes 15 and 16 downwards. The condenser lenses 8 and 9 form, in a normal manner, images of the tubes 15 and 16 in the plane 10 on both sides of the objective lens 11, as indicated by dashed circles 20 and 21 respectively.

If a scratch then deflects a light beam emanating from the light-blending element 4 in such a way that it is not incident on the objective lens 11, another light beam from the tubes 15 or 16 of the supplementary light source takes its place instead of contributing to the formation of the images at 20 or 21. This will happen as long as the scratch is not so excessively pronounced (deep and/or wide) that the first-mentioned light beam is not deflected out of the field containing the images 20 and 21 of the tubes.

In the production of prints on photographic material having variable contrast, with the use of light which has passed through one or both of the colour-selective filters 3 and 7, the otherwise unilluminated images of scratches are, instead, illuminated by light from one or both of the two flash tubes 15 and 16. The colour of the light supplied by these tubes will in general not coincide with the colour of the light supplied by the light-blending element 4, so that the scratched area of the negative is reproduced with a contrast which differs from that of the remaining areas of the print. However, it has been found that, when the illumination by the tubes 15 and 16 is adequate for hiding scratches in the lighter tones of the print, scratches in the darker tones are also no longer noticeable.

It has also been found that, when the enlarger is used for the production of a print on multi-colour printing material, the image of a scratch formed on a print is not noticed, if the image density is approximately correctly selected. The areas of the negative which are affected by scratches are in general reproduced with an incorrect colour balance. Since, however, the eye is not sensitive to colour within small areas, this is not serious.

FIG. 2 shows the light-blending element 4 in plan view, the condenser lenses 8 and 9 having been omitted. A negative strip 12 can be seen under the blending element 4. The tubes 15 and 16 preferably are in the arrangement shown, that is to say their longitudinal extents are parallel to any longitudinal scratches suffered by the negative. The arrangement hides those scratches preferentially which extend in the longitudinal direction of the negative strip 12.

By rotating the tubes or the negative, the scratches extending in other directions can be made to disappear as soon as the axes of the flash tubes are parallel to the direction of the scratches. It is also possible to provide four tubes, each being parallel to one edge of the negative.

Figure 3:
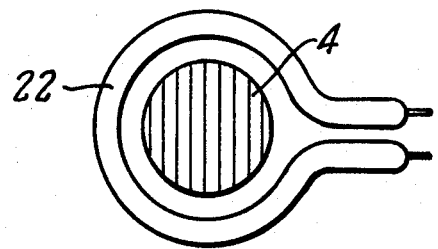

FIG. 3 shows a further embodiment in which the tubes 15 and 16 have been replaced by a single electronic flash tube 22 which extends essentially in the form of a ring and which surrounds the light-blending element 4. This arrangement makes it possible to hide scratches, independently of their direction, with equal effectiveness.

It should be noted that the term "electric flash tube" also includes arc discharge lamps filled with mercury vapour, xenon or another gas. The discharge can be continuous during the entire exposure time of the print, but it can also take place in the form of one or more discrete discharges, during which energy is taken for brief periods from a storage capacitor.

We claim:

1. A photographic enlarger with a printing light source which, via a condenser, illuminates a plane for receiving the original to be printed, an image of said original being formed in a printing plane by means of a lens, the image of the printing light source in the focal plane of the lens being at least not substantially larger than the range covered by the lens, the improvement comprising a supplementary light source which is positioned in such a way that, when no original to be printed is in position, an image of the supplementary light source is formed by the condenser in the focal plane of the lens but outside the range covered by the latter.

2. A photographic enlarger according to claim 1, in which the printing light source is formed by the output of a light-blending element which is fed by at least two primary light sources and the supplementary light source is positioned to the side of the output of the light-blending element.

3. A photographic enlarger according to claims 1 or 2, wherein the supplementary light source comprises at least two fluorescent tubes which are arranged in pairs in mutually opposite positions in relation to the printing light source or the light-blending element.

4. A photographic enlarger according to claim 3, wherein the fluorescent tubes are arranged parallel to the edges of the original to be printed.

5. A photographic enlarger according to claims 1 or 2, wherein the supplementary light source is a fluorescent tube which is in the form of a ring of a U and which surrounds the printing light source or the light-blending element.

6. A photographic enlarger according to claim 1 wherein the supplementary light source is a flash source.

7. A photographic enlarger according to claim 2, wherein the supplementary light source is positioned at least approximately in the same plane as the output of the light-blending element.

8. A photographic enlarger according to claim 2, wherein the light-blending element is an opal diffuser, a cylindrical rod of glass or acrylic resin, a plate of glass or acrylic resin, or an element having a structured light-mixing surface.

9. A photographic enlarger according to claim 2, wherein said supplementary light source also includes a light-screening means which prevents mixing of light from the supplementary light source with light from the primary light sources.

10. A photographic enlarger according to claim 1, wherein the supplementary light source to be printed is pivotable or rotatable about the optical axis of the printing light source.

* * * * *